United States Patent

Scaggs et al.

[11] Patent Number: 6,157,662
[45] Date of Patent: Dec. 5, 2000

[54] F$_2$ (157NM) LASER EMPLOYING NEON AS THE BUFFER GAS

[75] Inventors: Michael Scaggs, Weaton, Fla.; Frank Voss, Bad Ganders-heim, Germany

[73] Assignee: Lambda Physik GmbH, Goettingen, Germany

[21] Appl. No.: 09/317,526

[22] Filed: May 24, 1999

Related U.S. Application Data

[60] Provisional application No. 60/119,960, Feb. 12, 1999.
[51] Int. Cl.[7] .................................................... H01S 3/22
[52] U.S. Cl. .............................. 372/60; 372/57; 372/34
[58] Field of Search ................................. 372/57, 60, 34

[56] References Cited

U.S. PATENT DOCUMENTS

| | | | |
|---|---|---|---|
| 4,393,505 | 7/1983 | Fahlen | 372/57 |
| 5,377,217 | 12/1994 | Gabzdyl | 372/60 |
| 5,761,236 | 6/1998 | Kleinschmidt et al. | 372/100 |

OTHER PUBLICATIONS

Hooker et al;Influence of Cavity Configuration on the Pulse Energy of a High–Pressure Molecular Fluorine Laser; Ap pl. Phys. B55 No. 1,Jul. 1992.

*Applied Physics Letters,* vol. 63, No. 4, Jul. 26, 1993, "Small–signal gain measurements in an electron beam pumped F$_2$ laser," H.M.J. Bastiaens, B.MN.C. van Dam, P.J.M. Peters, and W. J. Witteman, 7 pgs.

*ZOS,* Akademie der Wissenschaften der DDR, Zentralinstitut fur Optik und Wissenschaften der DDR, Oktober 1987, "Leistungastarker atomarer Fluorlaser im roten Spektralbereich," Jurgen Lademann, Roland Kunig, Wadim Saidow, Rainer Weidauer, 12 pgs.

Discharge–Pumped Excimer Laser Research in Japan, Apr. 1988, "Theoretical simulation of a discharge pumped F$_2$ excimer laser." T. Uematsu et al. Keic U.

*Science Report, Lambdaphysik,* No. 3, Nov. 1990, "Breakthrough in F$_2$Laser Technology," 4 pgs.

Institut Pur Quantenoptik, Oct. 22, 1991, "Stimulated Raman scattering of a F$_2$–Laser in H$_2$." C. Momma, A. Tunnermann, P. Voβ, C. Windolph and B. Wellegehausen, 8 pgs.

*Highlights, Lambdaphysik,* No. 33, Feb. 1992, "VUV Stokes and Anti–Stokes Raman Lines Derived from an F$_2$ Laser," C. Momman, A Tunermann, F. voβ, C. Windolph, and B. Wellegehausen. 5 pgs.

*Highlights, Lambdaphysik,* No. 43, Jan. 1994, "Photochemical modification of Fluorocarbon Resin to Generate Adhesive Properties," 6 pgs.

*Highlights, Lambdaphysik,* No. 29, Jun. 1991, "VUV Spectroscopy by Frequency Tripling," 6 pgs.

"Processing of PTFE with High Power VUV Laser Radiation," D. Basting, U. Sowada, F. Vo.β, P. Oesterlin, 3 pgs.

*Journal of Applied Physics,* vol. 81, No. 6, Mar. 1997, "Small–signal gain measurements in a discharge–pumped F$_2$ laser," Tahei Kitamura, Yoshihiko Arita and Keisuke Maeda, Masayuki Takasaki, Kenshi Nakamura, Yoshiano Pujiwara and Shiro Horiguchi, 12 pgs.

*Journal of Applied Physics,* vol. 77, Jan. 1–15, 1995, "Long pulse electron beam pumped molecular F$_2$Laser," F.T.J.L. Lankhorst, H.M.J. Bastiaens, H. Botma, P.J.M. Peters, and W.J. Witteman, 8 pgs.

(List continued on next page.)

*Primary Examiner*—Leon Scott, Jr.
*Attorney, Agent, or Firm*—Limbach & Limbach L.L.P.

[57] ABSTRACT

An F$_2$-laser has a discharge chamber containing a laser gas mixture including fluorine as a laser active component and neon as a buffer gas. The gas mixture is surrounded by a resonator and supplied with a pulsed discharge by a pair of electrodes connected to a power supply circuit. The concentration of neon within the gas mixture is preferably higher than any other constituent gas, and is more preferably the only gas accompanying the laser active molecular fluorine. In addition, the gas mixture is preferably maintained at an elevated temperature such as near, yet below, a temperature at which outgassing occurs within the discharge chamber.

32 Claims, 5 Drawing Sheets

1. Laser tube containing the laser gas mixture, electrodes, fan and cooling unit
2. Rear optics module containing high reflective means (HR) which can be a mirror or a reflective grating for line narrowing and additionally optical elements for beam steering or forming like mirrors and prisms
3. Front optics module containing outcoupling means (OC) and optional additionally optical elements for beam steering, splitting or forming like mirrors, beam splitters, prisms and dispersive elements like gratings or etalons
4. Energy monitor detecting a signal proportional to output pulse energy
5. Output beam
6. Electrical pulse power and discharge module
7. Gas control box including vacuum pump, valves and gas compartment
8. Gas lines to the gas containers (e.g., gas bottles)
9. Computer control unit

OTHER PUBLICATIONS

*Applied Physics,* vo. 833, No. 4, Apr. 1984, "Intense Laser Generation from an Atomic–Fluorine," I.G. Koprinkov, K.V. Stamenov, and K.A. Stankov, 5 pgs.

*The Journal of Chemical Physics,* vol. 98, No. 11, Jun. 1993, "Laser photolysis of benzene at 158 nm," Tetsuya Shimada, Nobuaki Nakashima, Yasukazu, Izawa, and Chiyoe Yamanaka, 9 pgs.

*Chemistry Letters,* No. 7, 1992, "Photolysis of $Co_2$ with 158 nm ($F_2$ Laser. Reactivity of O ('D) with $CH_4$, $CF_3H$, and $CP,CH_3$," Masanobu Kojima, Yuichi Ojima, Nobuaki Nakashima, Yasukazu Izawa. Toru Akano, and Chiyoe Yamanaka, 10 pgs.

*The Journal of Physical Chemistry,* vol. 96, No. 15, Jul. 23, 1992, "Dissociation Rate Constants of Alkylbenzenes from Hot Molecules Formed by 168–nm ($F_2$ Laser) Irradiation," Tetsuya Shimada, Yuichi Ojima, Nobuaki Nakashima, Yasukazu Izawa, and Chiyoe Yamanaka, 10 pgs.

"Gas Flow and Chemical Lasers," vol. 1810, Sep. 21–26, 1992, "Theorelical Anti–Stokes Conversion of VUV Spectrum by Dual–Wavelength Pumped Stimulated Raman Scattering," Tsuneo Nakata, Fumihiko Kannari, and Minoru Obara, 18 pgs.

*Optics and Laser Technology,* vol. 11, No. 6, Dec. 1979, "CIF and $F_2$; two new ultra–violet laser systems," K. Hohla, M. Diegelmann, H. Pummer, K.L. Kompa, 6 pgs.

*Applied Physics B Photo–physics and Laser Chemistry,* vol. 855, No. 1, Jul. 1992, "Influence of Cavity Configuration on the Pulse Energy of a High–Pressure Molecular Fluorine Laser," S.M. Hooker, A.M. Haxell, and C.E. Webb, 6 pgs.

*Highlights Lambdaphysik,* Apr. 1993, "Excimer laser based microstructuring using mask projection techniques." U. Sarbach and H.J. Kahlerl, 4 pgs.

"High power efficient vacuum ultraviolet $F_2$ laser excited by an electric discharge," V.N. Ishchenko, S.A. Kochubei, and A.M. Razhev, 3 pgs.

*Conference on Lasers and Electro–optics,* 1990 Technical Digest Series, vol. 7, May 21–25, 1990, "Spectroscopic comparison between low and high pressure discharge pumped Xe atomic lasers," K. Komatsu, E. Matsui, S. Takahashi, Fumiko Kannari, M. Obara, 30 pgs.

*Applied Physics Letters,* vol. 56, Jun. 25, 1990, No. 36, "High specific output energy operation of a vacuum, ultraviolet molecular fluorine laser excited at 66 MW/cm by an electric discharge," Masayuki Kakehata, Etsu Hashimoto, Fumihiko Kannari and Minoru Obara, 6 pgs.

*Journal of Applied Physics,* vol. 50, June 1979, No. 6, "Novel neutral atomic fluorine laser lines in a high–pressure mixture of $F_2$ and He," Shin Sumida, Minoru Obara, and Tomoo Fujioka, 10 pgs.

*IEEE Journal of Quantum Electronics,* Nov. 1991, vol. 27, No. 11, "Efficiency Characterization of Vacuum Ultraviolet Molecular Fluorine ($F_2$) Laser 157 nm) Excited by an Intense Electric Discharge," Masayuki Kakehata, Tatsuya Uematsu, Fumihiko Kannari, and Minoru Obara, 10 pgs.

*Journal of Modern Optics,* vol. 37, No. 4, Apr. 1990, "Amplification characteristics of a discharge excited $F_2$ laser," C. Skordoulis, E. Sarantopoulou, S. Spyrou and A.C. Cetalas, 12 pgs.

*Optics Communications,* vol. 55, No. 6, Oct. 15, 1985, "Chain Measurements at 157 nm in an $F_2$ Pulsed Discharge Molecular Laser," A.C. Cetalas, C. Skordoulis, M. Kompitasas and C.A. Nicolaidea, 6 pgs.

*Applied Physics Letters,* vol. 54, Feb. 13, 1989, No. 7, "High–power discharge–pumped $F_2$ molecular laser," Kawakatsu Yamada, Kenzo Miyazaki, Toshifumi Hasama, and Takuzo Sata, 6 pgs.

*Leos '89, Lasers and Electro–Optics Society Annual Meeting Conference Proceedings,* Oct. 17–20, 1989, "High Power Discharge–Pumped $F_2$ Laser," K. Yamada, K. Miyazaki, T. Hasama, T. Sato, M. Kasamatsu, and Y. Mitsuhashi, 13 pgs.

*Journal of Applied Physics,* vol. 53, May 1982, No. 5, "Cain and saturation of the atomic fluorine laser," R. Sadighi Bonabi, F.W. Lee, and C.B. Collins, 11 pgs.

*Conference on Lasers and Electro–Optics,* 1989 Technical Digest Series, vol. 11, "Intense VUV–XUV generation from rare gas excimers," Wataru Sasaki, Kou Kuroaawa, 23 pgs.

*Soviet Journal of Quantum Electronics,* 16(5) May 1986, "High–power efficient vacuum ultraviolet $F_2$ laser excited by an electric discharge," V.N. Ishchenko, S.A. Kochubei, and A.M. Razhev, 9 pgs.

*Optics Communications,* vol. 28, No. 1, Jan. 1979, "Discharge pumped $F_2$ Laser at 1580 A", H. Pummer, K. Hohla, M. Diegelmann and J.P. Reilly, 6 pgs.

*Gas Flow and Chemical Lasers,* SPIE Vo. 1397, Sep. 10–14, 1990, "Frequency up–conversion of a discharge pumped molecular fluorine laser by stimulated Raman scattering in $H_2$," Masayuki Kakehata, Etsu Hashimoto, Fumihiko Kannari, and Minoru Obara, 16 pgs.

*The Journal of Chemical Physics,* vol. 69, Sep. 15, 1978, "An efficient, high power $F_2$ laser near 157 $nm^{-1}$,"Joseph R. Woodworth and James K. Rlue, 11 pgs.

*Verhandlungen,* Mar. 1990, Phsyikertagung Muchen.

*Tagungsband,* Vom. 24, Bis, 26, Sep. 1991, Abstract: "Vakuum UV Molekullaser mit hoher Ausgangsleistung," 3 pgs.

*Applied Physics Letters,* vol. 51, No. 13, Sep. 28, 1997, "Theoretical evaluation of high–efficiency operation of discharge–pumped vacuum–ultraviolet $F_2$ lasers," Mieko Ohwa and Minoru Obara, 6 pgs.

*Applied Optics VUV VI,* vol. 19, No. 23, Dec. 1, 1980, "Vacuum ultraviolet excimer lasers," M.H.R. Hutchinson, 9 pgs.

*Review of Scientific Instruments,* vol. 56, No. 5, May 1985, "Simple, compact, high–repetition rate XeCI laser," E. Armandillo. G. Grasso, and G. Salvetti, 7 pgs.

*Applied Physics Letters,* vol. 31, No. 1, Jul. 1, 1977, "VUV emissions from mixtures of $F_2$ and the noble gasses –A molecular $F_2$ laser at 1575 $A^{-1}$," James K. Rice, A. Kay Hays, and Joseph R. Woodsworth, 5 pgs.

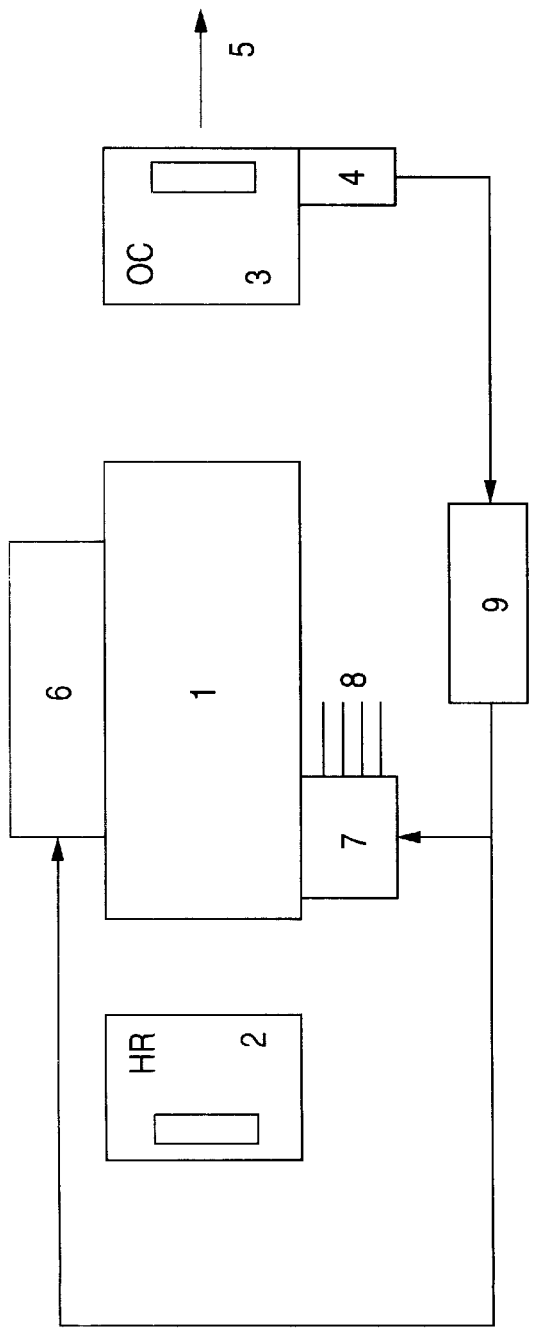

FIG. 1

1 Laser tube containing the laser gas mixture, electrodes, fan and cooling unit
2 Rear optics module containing high reflective means (HR) which can be a mirror or a reflective grating for line narrowing and additionally optical elements for beam steering or forming like mirrors and prisms
3 Front optics module containing outcoupling means (OC) and optional additionally optical elements for beam steering, splitting or forming like mirrors, beam splitters, prisms and dispersive elements like gratings or etalons
4 Energy monitor detecting a signal proportional to output pulse energy
5 Output beam
6 Electrical pulse power and discharge module
7 Gas control box including vacuum pump, valves and gas compartment
8 Gas lines to the gas containers (e.g., gas bottles)
9 Computer control unit SIMPLIFIED ENERGY LEVEL DIAGRAM OF
FLUORINE SHOWING THE LASER
TRANSITION IN THE REGION OF 157nm

$F_2$ (157NM) LASER EMPLOYING NEON AS THE BUFFER GAS

PRIORITY

This Application claims the benefit of U.S. Provisional Patent Application No. 60/119,960 filed Feb. 12, 1999, said application being incorporated herein by reference.

BACKGROUND OF THE INVENTION

1. Field of the Invention

The invention relates to an efficient $F_2$-laser, and particularly to an $F_2$-laser that exhibits improved performance at 157 nm. This improvement is achieved by using neon as the primary buffer gas and by operating the gas at a higher temperature.

2. Discussion of the Related Art

A particular type of gas discharge laser is the $F_2$-laser having an advantageous emission spectrum including one or more lines around 157 nm. This short wavelength, or high energy, (157 nm=around 7.9 eV) photon emission is advantageous for photolithography applications because the critical dimension (CD), which represents the smallest resolvable feature size producible using photolithography, is proportional to the wavelength. This permits smaller and faster microprocessors and larger capacity DRAMs in a smaller package. The 7.9 eV photon is also readily absorbed in high band gap materials like quartz, synthetic quartz (SiO2), Teflon (PTFE), and silicone, among others, such that the $F_2$-laser has great potential in a wide variety of material processing applications. The construction and electrical excitation of the $F_2$-laser differs from that of another type of gas discharge laser known as the excimer laser. One difference is that the laser gas of an excimer laser includes a laser active constituent gas which has no bound ground state, or at most a weakly bound ground state. The laser active gas molecule of the excimer laser disassociates into its constituent atomic components upon optical transition from the upper to the lower state. In contrast, the laser active gas constituent molecule ($F_2$) of the $F_2$-laser responsible for the emission around 157 nm is bound and stable in the ground state. In this case, the $F_2$ molecule does not disassociate after making its optical transition from the upper to the lower state.

The $F_2$-laser has been known since around 1977 [see, e.g., Rice et al., VUV Emissions from Mixtures of $F_2$ and the Noble Gases-A Molecular $F_2$ laser at 1575 angstroms, Applied Physics Letters, Vol. 31, No. 1, Jul. 1, 1977]. However, previous $F_2$-lasers have been known to exhibit relatively low gains and short gas lifetimes. Other parameters such as the pulse-to-pulse stabilities and laser tube lifetimes have been unsatisfactory. In addition, oxygen and water exhibit high absorption cross sections around the desired 157 nm emission line of the $F_2$-laser, further reducing overall efficiency at the wafer when encountered by the laser beam anywhere along its path. To prevent this absorption, one can maintain a purged or evacuated beam path for the $F_2$-laser free or relatively free of oxygen and water, however costly and burdensome it may be for the operator. In short, despite the desirability of using short emission wavelengths for photolithography, $F_2$-lasers have seen very little practical industrial application to date. It is desired to have an $F_2$-laser with enhanced gain, longer pulse lengths and pulse-to-pulse stability, and increased lifetime.

The VUV laser radiation around 157 nm of the $F_2$-molecule has been observed as being accompanied by further laser radiation output in the red region of the visible spectrum. This visible light originates from the excited fluorine atom (atomic transition). It is desired to have an $F_2$-laser wherein the output in the visible region is minimized in order to maximize the energy in the VUV region.

Although the active constituent in the gas mixture of the $F_2$-laser is fluorine, the amount of pure fluorine amounts to no more than about 5 to 10 mbar of partial pressure within the gas mixture. A higher overall pressure is needed to sustain a uniform discharge. Consequently, a buffer gas is needed to raise the discharge vessel pressure, typically to well above atmospheric pressure (e.g., 3–10 bars or more), in order to achieve a clean discharge and realize an efficient output of the 157 nm radiation.

For this reason, $F_2$-lasers have gas mixtures including an inert buffer gas of typically helium. When helium is used, however, the output in the red visible region can range to about one to three percent of the VUV emission. In addition, the VUV pulse lengths tend to be relatively short. As noted above, it would be desirable to minimize the visible output as well as to increase the length of the VUV output pulses in order to improve both line selection and line narrowing capability.

SUMMARY OF THE INVENTION

An object of the present invention is to provide a discharge-pumped $F_2$-laser with enhanced performance at the molecular fluorine transition around 157 nm.

Another object is to provide an $F_2$-laser wherein the output in the visible region is reduced in favor of the desired molecular fluorine transition around 157 nm.

Another object of the invention is to provide an $F_2$ laser having an increased pulse length so that line selection and line narrowing can be enhanced.

Another object of the invention is to provide an $F_2$-laser with greater overall energy and pulse-to-pulse stability, and longer laser gas and laser tube lifetimes.

These and other objects of the invention are achieved by providing an $F_2$-laser having a discharge chamber containing a laser gas mixture including fluorine and neon. The gas mixture is surrounded by a resonator and supplied with a pulsed discharge by a pair of electrodes connected to a power supply circuit to excite the laser active constituents of the gas mixture. The concentration of neon within the gas mixture is preferably higher than any other constituent gas, and is can be the only gas accompanying the laser active fluorine. In addition, the temperature of the gas mixture is preferably maintained at an elevated level.

BRIEF DESCRIPTION OF THE DRAWINGS

FIG. 1 shows a preferred embodiment of an $F_2$-laser in accord with the present invention.

DETAILED DESCRIPTION OF THE PREFERRED EMBODIMENT

Figure 2:
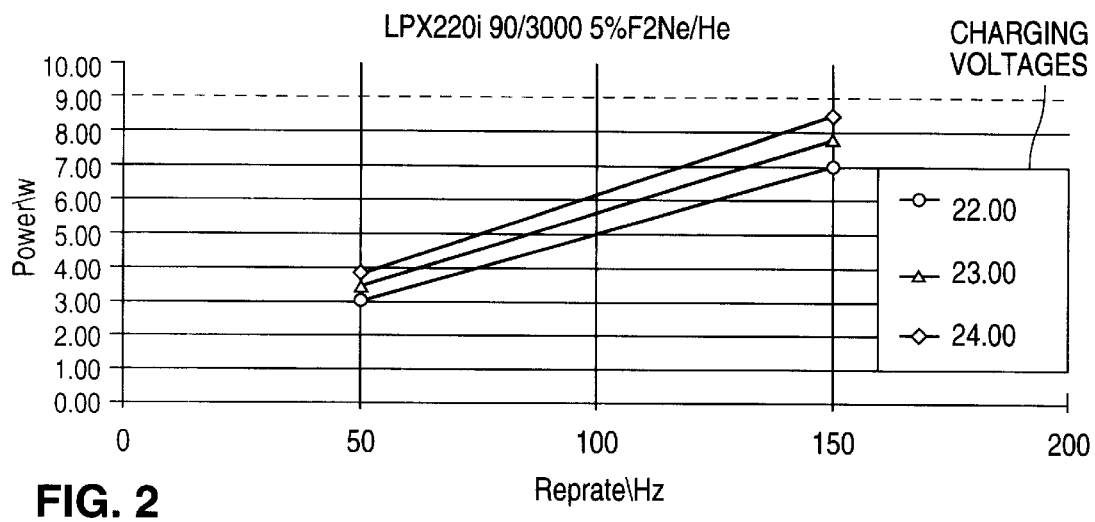
FIG. 2 is a graph of VUV output power versus repetition rate at different charging voltages for an $F_2$ laser having a gas fill consisting of a 90 mbar mixture of 5% $F_2$/95% Ne and 3000 mbar helium.

FIG. 1 schematically shows an $F_2$-laser system in accord with the present invention. The $F_2$-laser system includes a discharge chamber 1, resonator optics 2,3, an energy monitor 4 for detecting a signal proportional to the energy of the output beam 5, a pulse generating circuit 6, a gas control box 7 and gas lines 8, and a computer control unit 9. The discharge chamber 1 is filled with a gas mixture including fluorine and neon. The fluorine is a laser active component while the neon is a buffer gas. The fluorine concentration is closely monitored and controlled at a selected value. That value may be between 0.05% and 0.5%, and is preferably around 0.1%. For example, a preferred gas mixture might include a fluorine partial pressure of 3.5 to 5 mbar, and a neon buffer partial pressure of around 3000 mbar. The neon preferably accounts for the majority (greater than 50%) of the buffer gas. Neon may be used as the sole buffer gas. Alternatively, a minority amount of helium may be mixed in with the neon as a second buffer gas of the mixture. For example, the neon may account for 60% or more of the gas mixture, fluorine 0.1% and the balance helium.

A pair of electrodes are arranged within the discharge chamber 1 and are connected to a power supply circuit 6. A pulsed discharge from the electrodes serves to energize the laser active fluorine. UV-preionization of the electrical discharge laser is also provided and may be realized by means of an array of spark gaps or by another source of UV-radiation (surface, barrier or corona gas discharges), disposed in the vicinity of at least one of the solid electrodes of the main discharge of the laser. A preferred preionization unit is described in U.S. patent application Ser. No. 09/247,887 which is hereby incorporated by reference into this present application.

Figure 5:
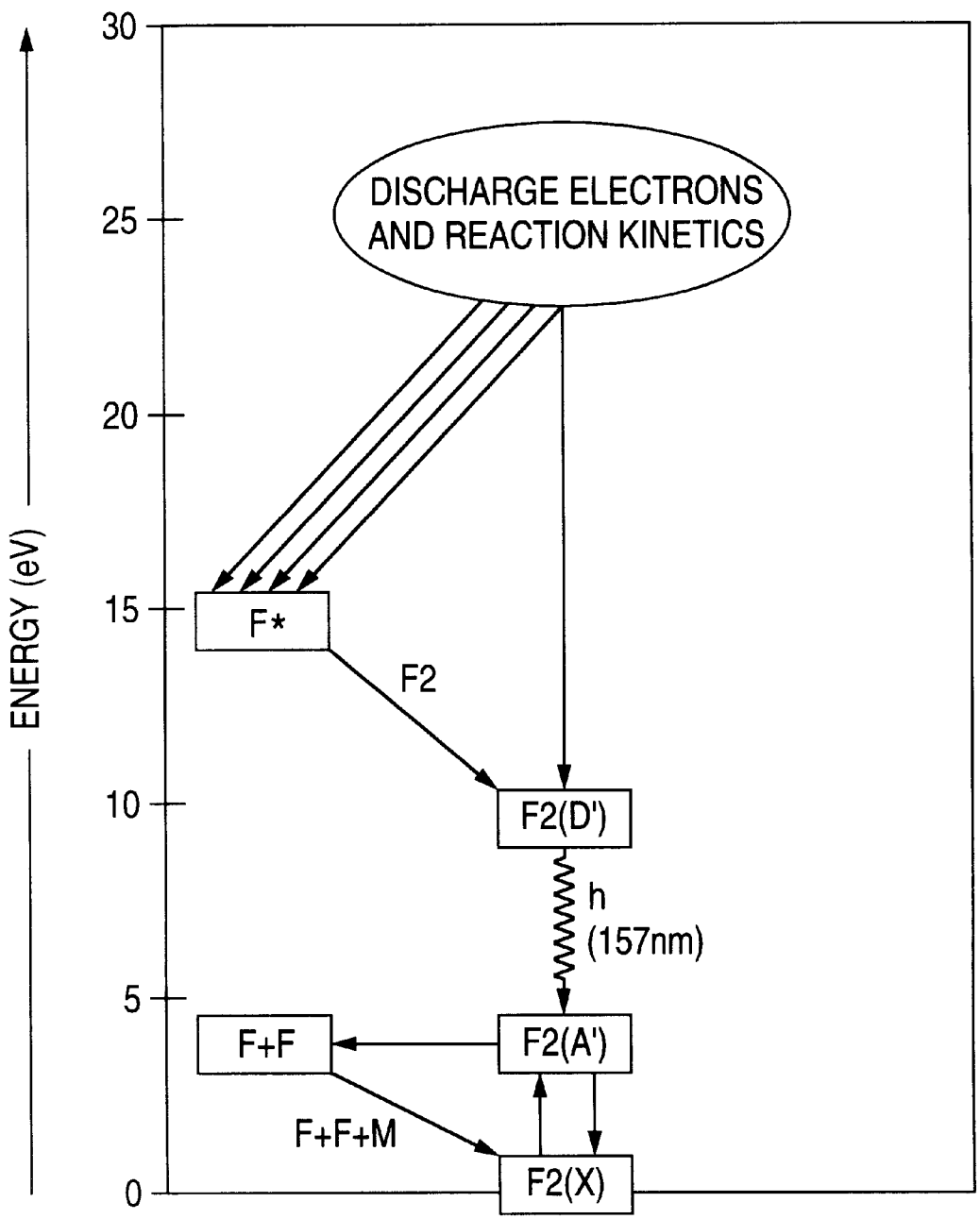
FIG. 5 is an energy level diagram for fluorine showing the 157 nm molecular fluorine transition.

A simplified energy level diagram is shown in FIG. 5 to illustrate the 157 nm transition of the $F_2$ molecules within the laser gas. The $F_2$-molecule does not dissociate when making the 157 nm optical transition, and instead simply relaxes, as shown. This is in stark contrast to excimer lasers that have laser active molecular species which dissociate as they make their optical transitions.

Referring back to FIG. 1, the discharge chamber has an optical window at each end comprising a material transparent around 157 nm such as $CaF_2$, $MgF_2$, $BaF_2$, or $SrF_2$. The discharge chamber is surrounded by a resonator including a rear optics module 2 having, e.g., a highly reflective mirror and an outcoupling mirror 3. The rear optics module may have means for selecting one of multiple closely-spaced lines around 157 nm and/or means for narrowing the linewidth of the output beam of the laser. Such linewidth selection and/or narrowing means may include any of one or more prisms, preferably comprising $MgF_2$ or $CaF_2$, etalons and/or a grating, although typical gratings exhibit poor performance at these very short wavelengths.

A signal detected by the energy monitor 4 and sent to the processor 9 allows the processor 9 to cooperate with the power supply electronics 6, or electrical pulse power and discharge module 6, to control the output power of the $F_2$-laser system in a feedback arrangement. The processor 9 also cooperates with the gas control box 7 which includes vacuum pump, valves and gas compartment. The gas control box 7 is connected to gas containers, e.g., gas bottles or cylinders, via gas lines 8. Among the gas control containers connected to the gas control box 7 are fluorine and neon.

In the preferred embodiment, the gas mixture has a neon concentration of greater than fifty percent. It has been found that when neon is used as the buffer gas, the output in the red visible regime attributed to atomic fluorine is reduced with respect to the 157 nm output. As noted above, a typical intensity of the red emission relative to the VUV emission around 157 nm for an $F_2$-laser having helium as a buffer gas is around 1%–3% for a well passivated $F_2$-laser having a fresh VUV optimized gas mixture. However, the intensity of the red emission for an $F_2$-laser having a fresh VUV optimized gas mixture is estimated to be less than 0.1%.

The pulse-to-pulse stability and the overall energy of the system are each also increased as the neon buffer gas replaces the helium buffer gas. This is deduced from the enhancement of the 157 nm line of the $F_2$-laser that accompanies the suppression of the red emission.

Using neon also yields the advantage of extending the lifetime of the $F_2$-laser tube. In one experiment, an $F_2$-laser using helium as its buffer gas was essentially found nonuseable after around 450 million pulses. That is, at that point, more of the output energy of the $F_2$-laser was in the red than at the desirable 157 nm VUV region. When the neon was substituted for the helium as the buffer gas, the $F_2$-laser returned to having substantial output near 157 nm. By replacing the helium with neon, the output of the $F_2$-laser was brought back close to specification making it useable again. Therefore, the lifetime of the laser tube of an $F_2$-laser can be extended by replacing helium with neon as the buffer gas.

Figure 3:
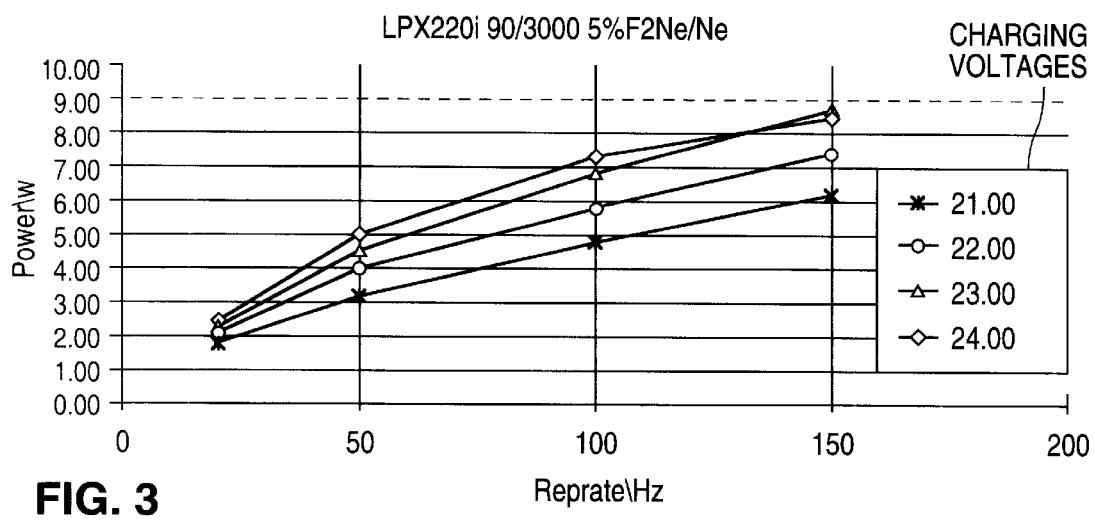
FIG. 3 is a graph of VUV output power versus repetition rate at different charging voltages for an $F_2$ laser having a gas fill consisting of a 90 mbar mixture of 5% $F_2$/95% Ne; 3000 mbar neon and no helium.
Figure 4:
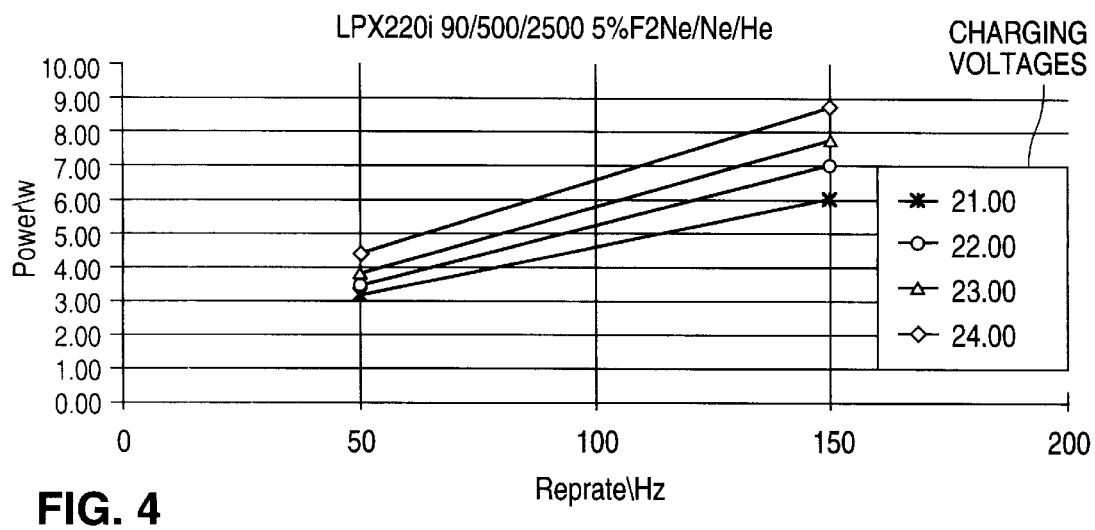
FIG. 4 is a graph of VUV output power versus repetition rate at different charging voltages for an $F_2$ laser having a gas fill consisting of a 90 mbar mixture of 56 $F_2$/95% Ne, 2500 mbar helium and 500 mbar neon.

FIGS. 2, 3 and 4 are graphs illustrating the VUV output of a Lambda Physik laser LPX 220i using molecular fluorine as the lasing gas. The laser was set up in the same manner for each of the experiments. Output power was measured at different charging voltages (ranging from 22 kV to 24 kV).

FIG. 2 shows a conventional gas mixture with primarily helium as a buffer gas (a 90 mbar mixture of 5% $F_2$/95% Ne and 3000 mbar helium). In this laser, output powers at a repetition rate of 150 hertz ranged from 6 watts (at 22 kV) to about 7.5 watts (24 kV).

FIG. 3 illustrates the same laser using only neon as the buffer gas (a 90 mbar mixture of 5% $F_2$/95% Ne and 3000 mbar neon). In this experiment, output powers were increased. At a repetition rate of 150 hertz, the power ranged from 7.5 watts (22 kV) to almost 9 watts (24 kV).

FIG. 4 illustrates the same laser wherein less than twenty percent of the buffer gas is neon (a 90 mbar mixture of 5% $F_2$/95% Ne; 2500 mbar helium and 500 mbar neon). Even with this relatively small level of neon, a significant improvement was observed with respect to operation with pure helium. More specifically, at a repetition rate of 150 hertz, the power ranged from 7 watts (22 kV) to about 9 watts (24 kV).

Another advantage to using neon as the primary buffer gas is that the laser pulse lengths can be increased. When the pulse lengths are increased, the light will circulate in the laser resonator for more round trips. With each round trip, the light interacts with the line selecting and line narrowing elements in the laser resonator. Thus, as the pulse length is increased, the line selection and line narrowing can be improved.

Figure 6A:
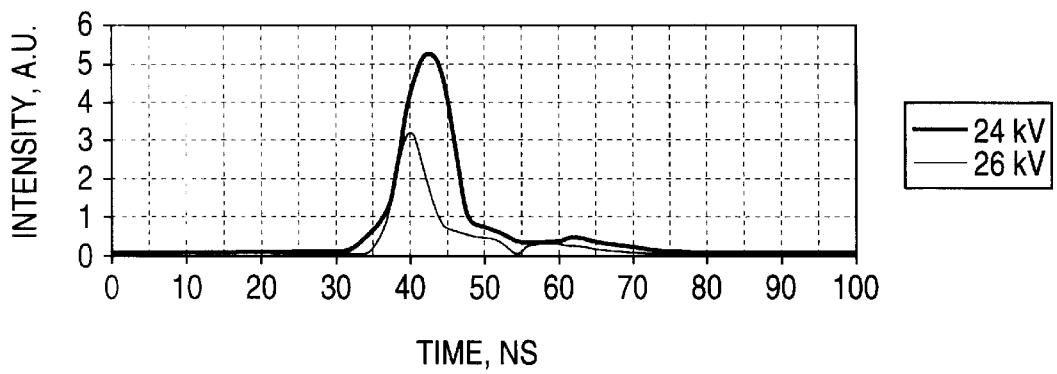
FIG. 6 illustrates the temperature dependence of the average output power of an $F_2$-laser in accord with the present invention.
Figure 6B:
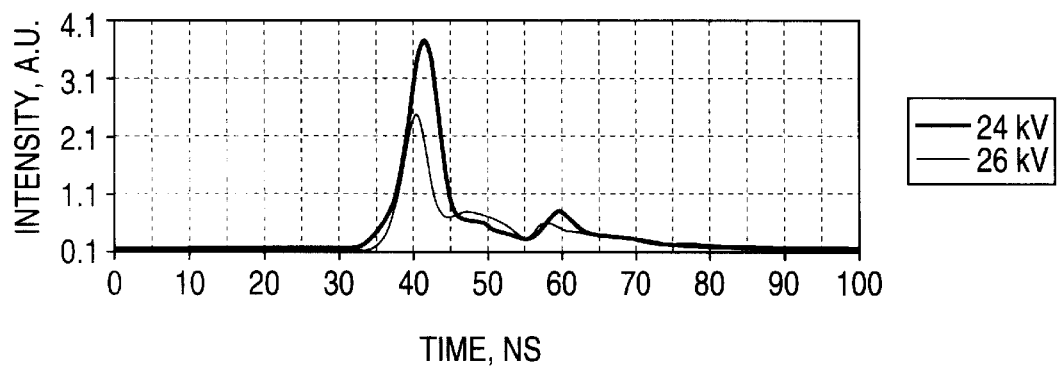
Figure 6C:
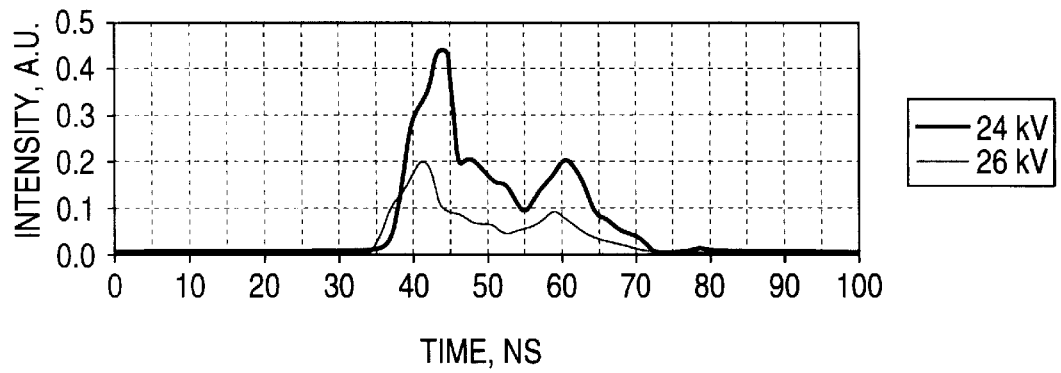

The present invention provides means of increasing the length of the pulse of the molecular fluorine laser by utilizing neon as a buffer gas. FIGS. 6a, 6b and 6c show the temporal pulse shape with the gas mixtures shown in Table 1:

TABLE 1

| Figure | Neon | Helium | Fluorine |
|---|---|---|---|
| 6a | 0 | 99.87% | 0.13% |
| 6b | 48.4% | 51.5% | 0.13% |
| 6c | 96.8% | 3.1% | 0.13% |

An increase in the concentration of neon in the gas mixture of the $F_2$-laser results in an increased pulse length from roughly 8 nsec (for 0% neon) to 25 nsec (for 96.8% neon).

In commercial excimer lasers, a high pumping level density is desired for the excitation of the $F_2$-laser. For example, 10 to 15 MW/cm$^3$ would produce an appreciable small signal amplification for oscillator operation. It is also recognized that the output energy of an $F_2$-laser at 157 nm should significantly rise as the density of the buffer gas within the discharge chamber is increased. For example, an output of 2.6 J/liter should be achievable. Referring to FIG. 5, this is mainly due to the fast depopulation of the lower laser level of a poorly bonding state (0.15 eV) of the $F_2$ molecule through collisions with the buffer gas.

Based at least in part on these observations, it is further recognized in the present invention that the temperature of the gas mixture consisting of $F_2$ and a buffer gas (e.g. He or Ne) should have a considerable influence on the output power of the $F_2$-laser. As described in detail below, experiments carried out with a commercial LAMBDA PHYSIK LPF205 $F_2$-laser otherwise also configured for optimal 157 nm operation with respect to the discharge conditions, gas mixture, beam path and gas purification, corroborate this hypothesis.

When performing these experiments, the $F_2$-laser was equipped with a platinum temperature sensor (PT100). Many other temperature sensors could have been used. The temperature sensor was located in the gas reservoir that had no appreciable contact with the vessel wall and indicated the gas temperature throughout laser operation. Temperature stabilization was realized using cooling water in cooling pipes in the gas reservoir and an adjustable water-water heat exchanger.

The temperature may be controlled by any of a variety of techniques. For example, the gas mixture may be maintained at an elevated temperature using an element containing hot water in proximity with the gas mixture. Another hot element, such as a rod, may be placed in proximity with the gas mixture. Warm gas may be circulated to the discharge area by a fan connected to a motor.

The $F_2$-laser was set to a constant discharge voltage of 26 KV as well as a repetition rate of 50 Hz. In order not to measure inlet/cleaning effects of the tube and gases, the VUV power was first measured with increasing gas temperatures in the range of 26 to 40° C. and then slowly lowered from 41° C. to 26° C. The laser power was measured as a function of temperature in this range.

Figure 7:
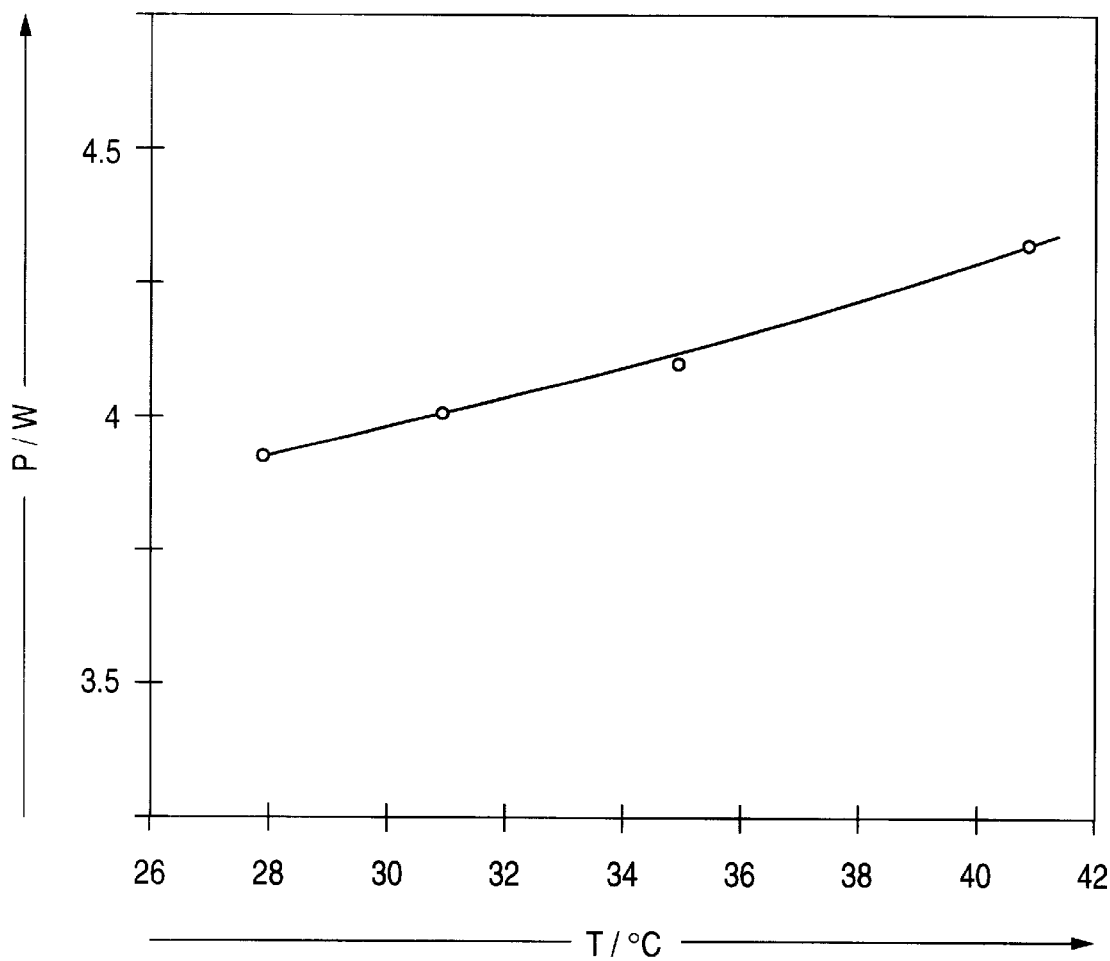
FIG. 7 shows the temperature dependence of the output power of the $F_2$-laser.

The results of the experiments are illustrated in FIG. 7. The graph in FIG. 7 shows the temperature dependence of the output power of the $F_2$-laser. An increase in output power around 157 nm from 3.85 W at 28° C. to 4.3 W at 41° C., was observed, as the graph of FIG. 7 shows. This represents a 10% increase in output power as the temperature is increased in this temperature range. This trend should continue until a gas temperature is reached at which the outgassing of surfaces, particularly sealing materials, becomes apparent. The outgassing would then cause a drop in the VUV output power due to absorption. Therefore, a preferred embodiment of the present invention provides an $F_2$-laser, such as that shown in FIG. 7, wherein the laser gas is elevated and maintained near, yet below, a temperature at which outgassing occurs within the discharge chamber.

It may be possible to raise the threshold temperature at which outgassing would occur in an $F_2$-laser by substituting different materials having more suitable temperature-dependent characteristics. For example, metal o-rings or metal sealing elements may be used instead of conventional o-rings. Ceramics or plastics may be used which transport heat less rapidly than metals, such as would be conventionally used in the construction of the frame of the $F_2$-laser.

The above description of the preferred embodiment set forth above is not meant to set forth the scope of the present invention. Instead, the scope of the present invention is that set forth in the claims that follow, and equivalents thereof.

What is claimed is:

1. An $F_2$-laser, comprising:
    a discharge chamber filled with a gas mixture including molecular fluorine for generating a spectral emission around 157 nm and a buffer gas including neon for pressurizing the gas mixture sufficiently to increase the output energy for a given input energy, said molecular fluorine being subject to depletion, said gas mixture being maintained at a temperature in excess of 26° C.;
    a pair of electrodes coupled with a power supply circuit producing a pulsed discharge to energize the molecular fluorine;
    a resonator generating an output laser beam,
    a gas supply system transferring molecular fluorine into said discharge chamber and thereby replenishing said molecular fluorine in the discharge chamber; and
    a processor cooperating with the gas supply system to control the molecular fluorine concentration within the discharge chamber to maintain said molecular fluorine concentration within a predetermined range of optimum performance of the $F_2$-laser.

2. An $F_2$-laser as in claim 1, wherein the concentration of said neon within said gas mixture is above 60%.

3. An $F_2$-laser as in claim 1, wherein neon is the exclusive buffer gas accompanying the molecular fluorine in the discharge chamber.

4. An $F_2$-laser as in claim 1, wherein the gas mixture temperature is maintained near, yet below, a temperature at which outgassing occurs within the discharge chamber.

5. An F2-laser as in claim 1, wherein the gas mixture temperature is in a range above 30° C. and below around 50° C.

6. An $F_2$-laser as in claim 1, wherein the concentration of said neon within said gas mixture is above 50%.

7. An $F_2$-laser, comprising:
    a discharge chamber filled with a gas mixture including molecular fluorine and a buffer gas for generating a spectral emission around 157 nm;
    a pair of electrodes coupled with a power supply circuit for producing a pulsed discharge to energize the molecular fluorine; and
    a resonator surrounding the discharge chamber, wherein the temperature of the gas mixture is maintained near, yet below, a temperature at which outgassing occurs within the discharge chamber.

8. An $F_2$-laser as in claim 7, wherein the gas mixture temperature is above 30° C.

9. An $F_2$-laser as in claim 7, wherein the gas mixture temperature is above 35° C.

10. An $F_2$-laser as in claim 7, wherein the gas mixture temperature is above 40° C.

11. An $F_2$-laser as in claim 7, wherein the gas mixture temperature is above 45° C.

12. An $F_2$- laser as in claim 7, wherein the buffer gas in the gas mixture is primarily neon.

13. An $F_2$-laser, comprising:
   a discharge chamber filled with a gas mixture including molecular fluorine for generating a spectral emission around 157 nm and a buffer gas including neon for pressurizing the gas mixture sufficiently to enhance the pulse to pulse stability of the laser, said molecular fluorine being subject to depletion, said gas mixture being maintained at a temperature in excess of 26° C.;
   a pair of electrodes coupled with a power supply circuit producing a pulsed discharge to energize the molecular fluorine;
   a resonator generating an output laser beam,
   a gas supply system transferring molecular fluorine into said discharge chamber and thereby replenishing said molecular fluorine in the discharge chamber; and
   a processor cooperating with the gass supply system to control the molecular fluorine concentration within the discharge chamber to maintain said molecular fluorine concentration within a predetermined range of optimum performance of the $F_2$-laser.

14. An $F_2$-laser as in claim 13, wherein the concentration of said neon within said gas mixture is above 60%.

15. An $F_2$-laser as in claim 13, wherein neon is the exclusive buffer gas accompanying the molecular fluorine in the discharge chamber.

16. An $F_2$-laser as in claim 13, wherein the gas mixture temperature is maintained near, yet below, a temperature at which outgassing occurs within the discharge chamber.

17. An F2-laser as in claim 16, wherein the gas mixture temperature is in a range above 30° C. and below around 50° C.

18. An $F_2$-laser, comprising:
   a discharge chamber filled with a gas mixture including molecular fluorine for generating a spectral emission around 157 nm and a buffer gas including neon for pressurizing the gas mixture sufficiently to increase the pulse length of laser output pulses of the laser, said molecular fluorine being subject to depletion, said gas mixture being maintained at a temperature in excess of 26° C.;
   a pair of electrodes coupled with a power supply circuit producing a pulsed discharge to energize the molecular fluorine;
   a resonator generating an output laser beam,
   a gas supply system transferring molecular fluorine into said discharge chamber and thereby replenishing said molecular fluorine in the discharge chamber;
   a processor cooperating with the gas supply system to control the molecular fluorine concentration within the discharge chamber to maintain said molecular fluorine concentration within a predetermined range of optimum performance of the $F_2$-laser.

19. An $F_2$-laser as in claim 18, wherein the concentration of said neon within said gas mixture is above 60%.

20. An $F_2$-laser as in claim 18, wherein neon is the exclusive buffer gas accompanying the molecular fluorine in the discharge chamber.

21. An $F_2$-laser as in claim 18, wherein the gas mixture temperature is maintained near, yet below, a temperature at which outgassing occurs within the discharge chamber.

22. An F2-laser as in claim 21, wherein the gas mixture temperature is in a range above 30° C. and below around 50° C.

23. An $F_2$-laser, comprising:
   a discharge chamber filled with a gas mixture including molecular fluorine for generating a spectral emission around 157 nm and a buffer gas including neon for pressurizing the gas mixture sufficiently to increase the lifetime of the laser tube, said molecular fluorine beings subject to depletion, said gas mixture being maintained at a temperature in excess of 26° C.;
   a pair of electrodes coupled with a power supply circuit for producing a pulsed discharge to energize the molecular fluorine;
   a resonator for generating an output laser beam,
   a gas supply system for transferring molecular fluorine into said discharge chamber and thereby replenishing said molecular fluorine in the discharge chamber; and
   a processor for cooperating with the gas supply system to control the molecular fluorine concentration within the discharge chamber to maintain said molecular fluorine concentration within a predetermined range of optimum performance of the $F_2$-laser.

24. An $F_2$-laser as in claim 23, wherein the concentration of said neon within said gas mixture is above 60%.

25. An $F_2$-laser as in claim 23, wherein neon is the exclusive buffer gas accompanying the molecular fluorine in the discharge chamber.

26. An $F_2$-laser as in claim 23, wherein the gas mixture temperature is maintained near, yet below, a temperature at which outgassing occurs within the discharge chamber.

27. An F2-laser as in claim 26, wherein the gas mixture temperature is in a range above 30° C. and below around 50° C.

28. An $F_2$-laser, comprising:
   a discharge chamber filled with a gas mixture including molecular fluorine for generating a spectral emission around 157 nm and a buffer gas including neon for pressurizing the gas mixture sufficiently to increase the intensity of the 157 nm spectral emission relative to a red emission of the laser, said molecular fluorine being subject to depletion, said gas mixture being maintained at a temperature in excess of 26° C.;
   a pair of electrodes coupled with a power supply circuit producing a pulsed discharge to energize the molecular fluorine;
   a resonator generating an output laser beam, and wherein the neon buffer gas has a concentration sufficient to increase the intensity of the 157 nm spectral emission relative to a red emission of the laser;
   a gas supply system transferring molecular fluorine into said discharge chamber and thereby replenishing said molecular fluorine in the discharge chamber; and
   a processor cooperating with the gas supply system to control the molecular fluorine concentration within the discharge chamber to maintain said molecular fluorine concentration within a predetermined range of optimum performance of the $F_2$-laser.

29. An $F_2$-laser as in claim 28, wherein the concentration of said neon within said gas mixture is above 60%.

30. An $F_2$-laser as in claim 28, wherein neon is the exclusive buffer gas accompanying the molecular fluorine in the discharge chamber.

31. An $F_2$-laser as in claim 28, wherein the gas mixture temperature is maintained near, yet below, a temperature at which outgassing occurs within the discharge chamber.

32. An F2-laser as in claim 31, wherein the gas mixture temperature is in a range above 30° C. and below around 50° C.

* * * * *